Figure 1:
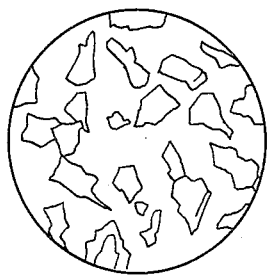

C. A. BAECHLER.
SOLUBLE CASEIN.
APPLICATION FILED NOV. 10, 1908.

999,083.

Patented July 25, 1911.

WITNESSES
Jesse B. Heller.
R. H. Balderson

INVENTOR
C. A. Baechler,
by Bakewell, Byrnes & Parmelee,
his Attys.

UNITED STATES PATENT OFFICE.

CARL ALBRECHT BAECHLER, OF ZURICH, SWITZERLAND.

SOLUBLE CASEIN.

999,083.  Specification of Letters Patent.  Patented July 25, 1911.

Application filed November 10, 1908. Serial No. 461,925.

*To all whom it may concern:*

Be it known that I, CARL ALBRECHT BAECHLER, a citizen of Switzerland, residing at 5 Köllikerstrasse, Zurich, Switzerland, dairy-engineer, have invented certain new and useful Improvements in Soluble Casein, of which the following is a specification.

Hitherto finely subdivided casein has only been obtainable either by grinding the curd separated directly from the milk, or by redissolving the curd and precipitating the casein from the solution or drying the solution.

This invention relates to the manufacture of a casein which is obtained directly from milk in a finely subdivided or more or less pulverulent condition so that it does not have to be ground.

It is known that when the coagulum of casein formed in milk by the addition of a ferment or by lactic fermentation is, at the time of its formation, destroyed by shaking or stirring, the casein is subdivided into a finely flocculent condition, but quickly passes into an agglomerated condition when the movement is suspended, so that when dried it assumes a coarse granular form. It is also known that a milk which does not react normally with the rennet ferment can be improved, in respect of its tendency to be coagulated, by addition of a calcium salt.

The present invention is based upon the discovery that under suitable conditions and in presence of a material having the known property of causing casein to shrink, which material will hereinafter be termed a contracting agent, the casein subdivided by agitation at the time when its coagulum is formed, does not agglomerate when the agitation ceases but remains in a fine-grained condition in which, when drained from the whey, it retains so little water that it is comparatively dry, and remains, both then and when subsequently completely dried, in the form of fine grains which do not adhere together.

The selection for the purpose of the invention of a contracting agent having the aforesaid property depends on the characteristics required in the finished product. When the requirement is that the casein shall be as white as possible and as tasteless and odorless as possible, the added contracting agent must be compatible with these features. When the casein is to be used as food and milk sugar is to be made from the whey, the contracting agent must be nonpoisonous in the proportion used and without effect on the process for extracting milk sugar. There are a number of contracting agents fulfilling these conditions, but salts of alumina have been found most advantageous, for instance, an alum or aluminium sulfate.

The accompanying drawing will make clear the distinction between the product of this invention and the forms of finely divided casein hitherto known. Each figure is a copy of a microphotograph, the magnification being 200 diameters.

Figure 2:
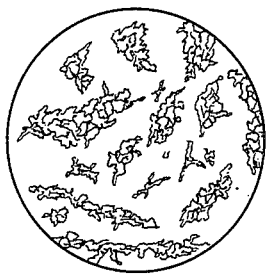
Figure 3:
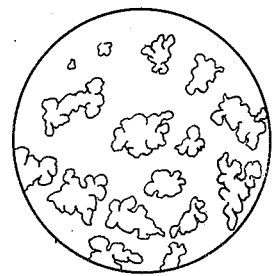

Figure 1 represents ordinary ground casein, Fig. 2 casein which has been redissolved and precipitated or obtained by drying the solution, and Fig. 3 the product made according to the present invention, having grains finely subdivided by agitation when the coagulum is formed and which have rounded and not angular profiles.

The manufacture consists in adding to the milk, preferably warmed to the temperature most favorable to the action of rennet, a substance, such as a calcium salt, which enhances the tendency of the casein to be coagulated by rennet and then allowing a suitable proportion of the rennet ferment to act in the presence of the contracting agents like alum; these contracting agents may be added before, together with, or after the rennet ferment. As soon as the coagulum forms, the whole is continuously stirred and first heated up to a temperature not exceeding 100° C., and then cooled to a temperature not less than 0° C., the stirring being continued until the granulated casein is sufficiently dry in appearance and has lost the property of agglomerating.

The proportion of calcium salt to be added depends on the nature of the milk and particularly on whether the skim milk used has been heated only to 35° C. or to pasteurizing temperature or even higher. When the milk is of such a nature that it does not require any addition to enhance its sensitiveness to the action of rennet, the addition of calcium salt or the like may be omitted.

The following specific example may be given, it being understood that the invention is in no way limited thereto:—To the skim milk, warmed to 30°–32° C. calcium chlorid dissolved in a little water is added to the extent of 0.5 part of the salt per 1000 parts of the skim milk. A solution of rennet ferment is then added in such proportion that coagulation begins within 5 minutes. At the moment when the first indication of coagulation is perceived, rapid stirring by means of a stirring device is started and when the casein has become finely subdivided, 1 part per 1000 of ammonia alum, dissolved in a little water, is added; the whole is now heated, while stirring, until during 5-10 minutes the temperature has risen gradually to 52° C., whereupon, while still stirring, the whole is cooled again in any known suitable manner, the temperature being brought to 15° C.

The alum may be added before the rennet ferment or together therewith, instead of at the stage stated.

The casein is separated from the whey either by filtration or centrifugal action and washed; in the first case it is pressed and in either case the cake obtained is broken up and dried in a current of air, with aid of warming if necessary; the drying is complete in a few hours.

If an acid casein is required, one of two procedures may be adopted. The washed, but not dried, neutral casein may be moistened with a suitable acid of known strength added in the smallest possible proportion compatible with obtaining the desired acid character, and the moistened casein further treated as prescribed for the neutral casein. In this case the whey remains free from acid. Or instead of using a ferment such as rennet for coagulating the casein, the desired acid may be used as the precipitant, or the milk may be allowed to coagulate spontaneously, that is by lactic fermentation; in either case the further treatment of the casein is as prescribed for neutral casein. The whey is acid in this case.

Having thus described the nature of this invention and the best means I know of carrying the same into practical effect, I claim:—

1. A process for the manufacture of a finely subdivided casein, which process consists in first adding to milk an agent to form a coagulum of casein and an agent to act upon and cause the casein to shrink, then, at the moment when the coagulation is first perceived, rapidly agitating the whole until the casein is in a finely subdivided condition, then, while continuing to agitate, successively heating the whole to a temperature not exceeding 100° C. and cooling it to a temperature not below 0° C., and finally separating and drying the finely subdivided casein.

2. As a new article of manufacture, finely subdivided but unground casein, having the form of grains with rounded profiles, which grains do not agglomerate.

3. As a new article of manufacture, casein in the form of minute grains with rounded profiles, which grains do not agglomerate.

In testimony whereof I have signed my name to this specification in the presence of two subscribing witnesses.

CARL ALBRECHT BAECHLER.

Witnesses:
 ALBERT BOLLER,
 EMIL FREY.